June 27, 1967 — F. PACHECO — 3,328,789
TANK LEVEL INDICATOR
Filed March 1, 1965

INVENTOR.
FRANCISCO PACHECO
BY
ATTORNEY

United States Patent Office 3,328,789
Patented June 27, 1967

3,328,789
TANK LEVEL INDICATOR
Francisco Pacheco, Astoria, N.Y., assignor to Spillpruf
Corporation, New York, N.Y.
Filed Mar. 1, 1965, Ser. No. 436,227
4 Claims. (Cl. 340—224)

ABSTRACT OF THE DISCLOSURE

A telemetering system for indicating the level of fluid in a tank disposed at one location and reporting this level to a second location at which fluid is being fed into the tank through a supply line, the system including a conductive probe inserted in the tank and having a tip which is contacted by the fluid therein only when the tank level is at a maximum, thereby activating an audio oscillator which modulates a radio transmitter to transmit the audio signal to the second location, thus indicating the point at which the tank level is at its maximum.

Figure 1:
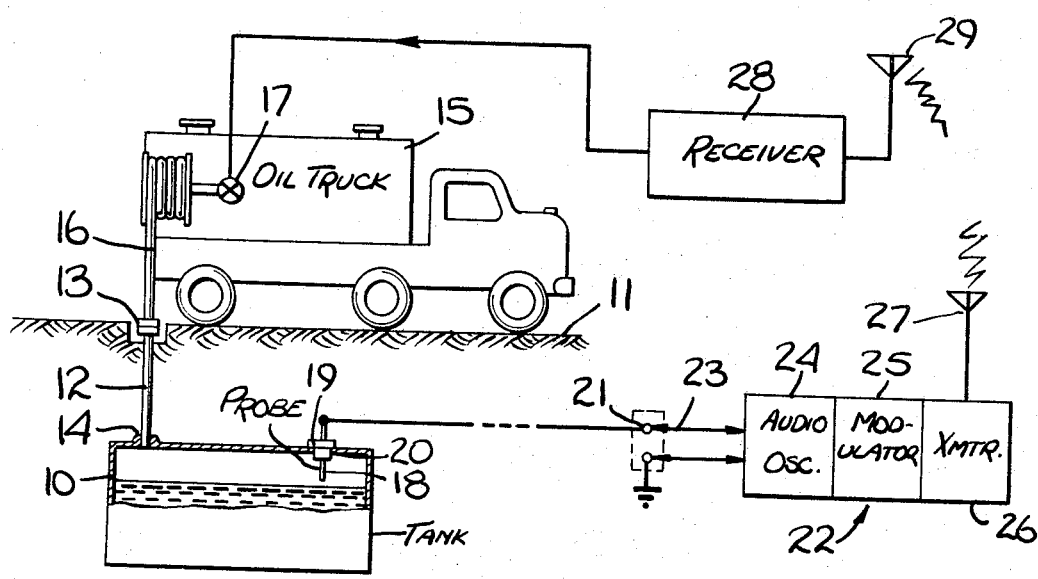

This invention relates generally to telemetering devices to detect the level of liquid in a tank at a first station and to report this level to a second and remote station, and more particularly to a system for detecting the level of oil in a tank within a building and for transmitting this information to a point outside the building.

Oil is now widely used as heating fuel for apartment houses, industrial plants, and for many other types of buildings. Fuel for the oil burner is stored in a tank, usually located in the basement of the building. When the oil reserve in the tank is low, additional oil is delivered by an oil truck which is driven to the building. Oil from the truck is fed to the tank in the basement by means of a supply line having an inlet well on the sidewalk in front of the building or at some other accessible location.

Usually the operator of the truck is asked to fill up the tank, regardless of how much oil still remains therein. If the operator knows the exact capacity of the tank and the existing level of oil therein, he can then estimate how many gallons are required to fill the tank. However, this information is generally not available, and what the operator customarily does is to feed oil into the tank, while metering its flow, until the tank is full. While it is possible to gauge the oil level in the tank by a measuring stick projected therein through an opening, since the tank is disposed within the building while the delivery truck is exterior thereto, the operator cannot be in both places. Instead of determining the actual level of fuel in the tank as oil is fed therein, the operator continues to feed the oil until an overflow point is reached, where even the supply line to the tank is filled, this being indicated when the oil then proceeds to spill over onto the sidewalk and the surrounding area. Thereupon the operator shuts off the supply valve as quickly as he is able, but it is already too late to prevent the hazardous conditions which arise from an oil slick on the sidewalk.

Accordingly, it is the main object of this invention to provide an electronic system for gauging the level of fuel in a tank at one station, and for transmitting this information to another station at which fuel is being supplied into the tank, whereby the flow of oil may be arrested before an overflow condition arises.

A significant advantage of the invention resides in the fact that no electrical current is passed into the tank, and that the indication is conveyed to a remote point without the use of wires.

More specifically, it is an object of the invention to provide a system of the above type constituted by a transmitter operating in conjunction with a probe extending into the tank, such that when the oil level reaches the tip of the probe, the transmitter is modulated to produce an audible signal in a receiver. By placing the transmitter in the basement adjacent the tank and the receiver next to the operator at the delivery truck, the operator is immediately informed when the capacity level of liquid is reached in the tank, and he therefore is in a position to shut off the supply at the appropriate time.

A further advantage of the invention is that both the transmitter and receiver constituting the telemetering system are portable, hence it is not necessary to install the system permanently at each tank. In practice, the truck operator makes a temporary installation with each delivery, and after the tank is filled, he removes the units for use at the next delivery point.

Also an object of the invention is to provide an electronic system of the above type wherein the receiver acts automatically to shut off the valve in the delivery truck when a signal is received indicative of a full tank.

Yet another object of the invention is to provide an electronic indicator which is also capable of detecting the presence of smoke in the stack of an oil burner and of automatically cutting off the burner operation until the faulty condition giving rise to such smoke is corrected.

While the invention will be described mainly in connection with detecting the level of oil in a tank, it will be appreciated that the same system is operable for sensing the level of any liquid. The system may be used in place of float mechanisms, photoelectric devices, and other more expensive and less reliable devices.

Figure 2:
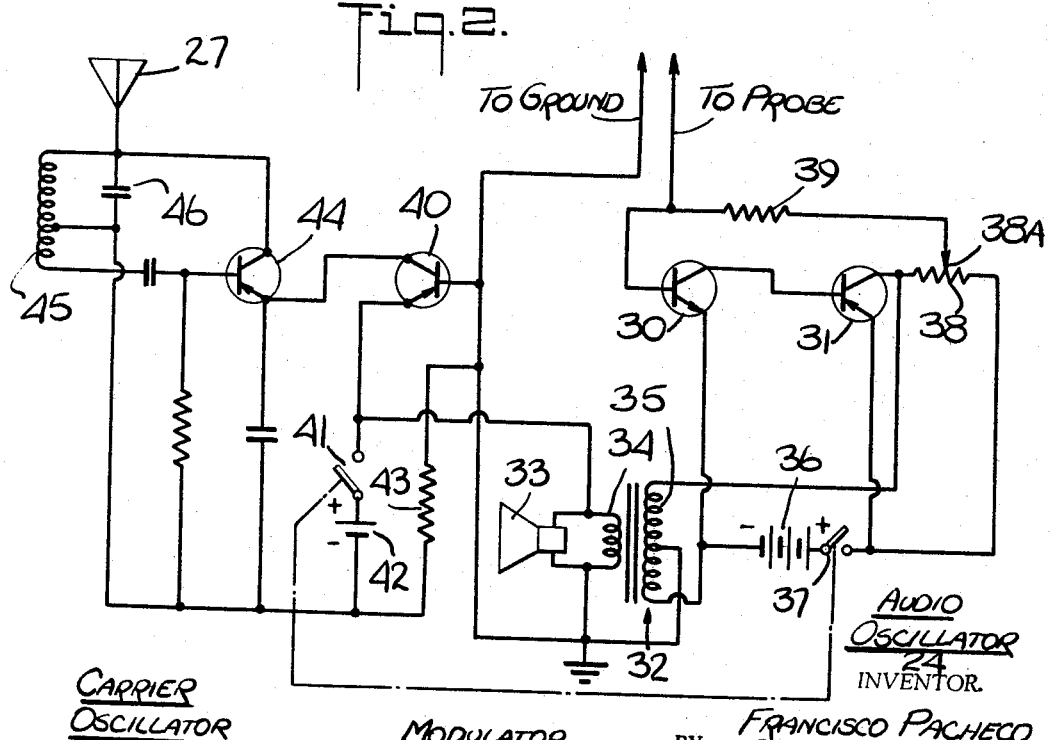

For a better understanding of the invention, as well as other objects and further features thereof, reference is made to the following detailed description to be read in conjunction with the accompanying drawing, wherein:

FIG. 1 schematically shows a telemetering system in accordance with the invention for detecting and transmitting an indication of oil level in a submerged tank to a receiver remote therefrom; and FIG. 2 is a schematic circuit diagram of one embodiment of a transmitter of the type incorporated in said system.

Referring now to FIG. 1, there is shown an oil tank 10, such as a standard No. 6 fuel oil storage tank of the type used in conjunction with oil burner systems, the tank being disposed in the basement of a building below the level of sidewalk 11. Fuel is supplied to the tank by means of a gravity line 12 extending between a covered well 13 embedded in the sidewalk and an input port 14 in the top of the tank.

When the oil level in the tank is low, additional oil is supplied thereto by a delivery truck 15, which is driven by an operator to a point adjacent well 13. The supply tank on the truck is coupled to supply line 12 by means of retractable hose 16, the oil fed thereto being controlled by a suitable valve 17.

In order to detect the oil level in the tank, a probe 18 is permanently inserted therein through an insulating cap 19 placed in the stick well 20 of the tank. Probe 18 is in the form of an electrically conductive rod, and in practice extends about six inches into the tank, whereby the oil in the tank only makes contact with the tip of the probe when it reaches its maximum level in the tank.

Probe 18 is connected to one terminal of a female element 21 of a double terminal electrical connector, the other terminal being grounded. The female element is permanently installed in the basement of the building or elsewhere therein, such as at the Remote Switch location of the oil burner.

When an oil delivery is being made, the operator takes along a portable radio transmitter unit 22 which equipped with a male element 23 to be plugged into female element 21. Transmitter unit 22 comprises an audio oscillator 24 whose output is applied to a modulator stage 25 which acts to impose the modulation signal on the carrier of a high-frequency transmitter 26, the modulated carrier being fed to a radiating antenna 27. The output of transmitter 22 is picked up by a radio receiver 28 having an antenna 29, the receiver being tuned to the carrier frequency of transmitter 22. The transmitter arrangement is such that when the level of oil in tank 10 is below that of probe 18, no audio signal is transmitted, but at the instant the oil makes contact with the probe, an audio signal is generated which can be clearly heard at the receiver. Hence, in practice, after the transmitter 22 is plugged in, the operator returns to his truck, he couples hose 16 to supply line 12, and proceeds to feed oil in the tank. The movement, however, hears the audio signal in his receiver, he closes valve 14, for then the tank level has reached its maximum point.

This operation can be made automatic by the use of a solenoid-actuated valve whose operation is controlled by the output of the receiver, such that when the audio output is generated, the valve is caused to close.

Referring now to FIG. 2, the transmitter 22 is shown in its circuit details. The audio oscillator 24 comprises transistors 30 and 31, an output transformer 32, and a permanent-magnet speaker 33 connected to the secondary 34 of the transformer. One end of the primary 35 of the transformer is connected to the collector of transistor 30, the other end being connected to the emitter through battery 36, a switch 37 and a potentiometer 38, the center tap of the secondary being grounded.

The adjustable slider 38A of the potentiometer 38 is connected through a resistor 39 to the base of transistor 31 whose collector is connected to the base of transistor 30 and whose emitter is connected to the negative terminal of battery 36. The base of transistor 30 is also connected through male element 23 to probe 18 in the tank.

In operation, when switch 37 is closed, the circuit acts as an audio oscillator to produce a high-pitched signal which is reproduced in loudspeaker 33. Potentiometer 38 is then adjusted to a point just below which the audio signal is audible. It will be noted that transistor 30 is connected as an input amplifier with respect to transistor 31, which is connected as an audio oscillator. When, therefore, probe 18 makes contact with the oil in the tank 10, the base of transistor 30 is then effectively connected to ground through the oil in the tank. As a consequence of the static charge due to ionization in the oil, which charge is applied to the base of transistor 30 relative to ground, the audio oscillations, which were reduced by potentiometer 38 below the audible level, again become clearly audible, thus indicating that the tank is now at its full capacity level.

The audio signal applied to speaker 33 is also fed to transistor 40 in the modulator stage 25, the signal being applied between the emitter and base of this transistor. The emitter of transistor 40 is connected through switch 41, battery 42, and resistor 43 to the base of this transistor, such that when switches 41 and 37, which are ganged, are simultaneously closed, the entire transmitter unit is rendered operative.

The collector of transistor 40 is connected to the emitter of transistor 44 in the oscillator 24, the collector and base of transistor 44 being connected to the ends of a resonator coil 45 which in practice may be fixed by a condenser 46 to a high-frequency carrier in the order of 450 kilocycles. The receiver 28 is therefore tuned to the same frequency. In practice, it is only necessary that the transmitter have a range of about 50 to 500 feet, hence a highly compact low-power unit may be used.

Thus the operator, after plugging in the transmitter to the probe, first turns potentiometer 38 until he distinctly hears the audio signal on speaker 33, which assures him that the transmitter 38 is in working order. He then turns potentiometer 38 to a position at which the signal becomes inaudible and will remain so until probe 18 makes contact with the oil. The operator, leaving the transmitter connected, then returns to his truck where he turns on his receiver. Nothing is heard in the receiver except the hiss indicative of the fact that the audio signal is just below the audible level. When, after the oil is fed into the tank, the audio signal is heard, indicating a capacity condition, the operator immediately closes the shut-off valve.

While the system has been shown as a means to detect the level of oil in a tank, the audio oscillator arrangement, apart from the modulator and carrier transmitter, is also capable of detecting the presence of smoke in the stack or flue of an oil burner. Such smoke is indicative of incomplete combustion of other defective condition in the burner system.

By placing the probe in the stack and adjusting the potentiometer 38 to the point at which the audio signal is below the audible level, the signal will be rendered audible only when smoke appears in the stack, for ionization of the smoke creates a static charge which triggers off the oscillator.

The audible signal heard in speaker 33 provides a warning indication. The device can operate to turn off the oil burner when the presence of smoke is indicated, by the use of a relay connected across secondary 34 and responsive to the audio voltage to cut off the oil burner switch.

While there has been shown and described a preferred embodiment of tank level indicator in accordance with the invention, it will be appreciated that many changes and modifications may be made therein without, however, departing from the essential spirit of the invention as defined in the annexed claims.

What I claim is:

1. A telemetering system for sensing the fluid level of a tank disposed at one location and reporting this level to a second location at which fluid is being fed into the tank through a supply line, said system comprising:
   (a) a conductive probe inserted in said tank, the tip thereof being contacted by said fluid only when said tank level is at a maximum,
   (b) an audio oscillator coupled to said probe, said audio oscillator generating an audio signal only when said probe tip is contacted by said fluid,
   (c) a radio transmitter coupled to said oscillator and modulated thereby to transmit said audio signal, and
   (d) a radio receiver disposed at said second location and tuned to said transmitter to pick up said audio signal and including means responsive to the detection of said audible signal indicating the point at which said tank level is at its maximum.

2. A telemetering system for sensing the fluid level of a tank disposed at one location and reporting this level to a second location at which fluid is being fed into the tank through a supply line, said system comprising:
   (A) a transmitting station at said one location and including
      (a) a conductive probe inserted in said tank, the tip thereof being contacted only when fluid in the tank reaches a capacity level,
      (b) an audio oscillator coupled to said probe and having a loudspeaker output, said oscillator being provided with means to adjust its output to a point at which no audible output is heard in said speaker until fluid contacts said tip, and
      (c) a radio transmitter coupled to said oscillator and modulated thereby to transmit said audible signal on a carrier, and
   (B) a receiving station at said second location and including means to receive said carrier and to reproduce said audible signal and means responsive to the detection of said audible signal to indicate the point at which the tank level is at its maximum.

3. A system as set forth in claim 2, wherein said audio oscillator includes an input amplifier stage coupled to said probe to increase the volume of oscillation when said probe is contacted by said fluid.

4. A system as set forth in claim 2, further including valve means to control the flow of fluid into said tank, and means responsive to the receiver output to shut off said valve when said audio signal is received.

References Cited

UNITED STATES PATENTS

| | | | |
|---|---|---|---|
| 2,202,197 | 5/1940 | Ewertz | 340—244 |
| 2,213,961 | 9/1940 | Hunter. | |
| 2,225,464 | 12/1940 | Santino | 340—244 X |
| 2,477,511 | 7/1949 | Comb | 340—224 X |
| 2,946,991 | 7/1960 | Lindenberg | 340—244 |
| 2,988,708 | 6/1961 | Schmidt | 340—384 X |
| 3,037,165 | 5/1962 | Kerr. | |
| 3,042,908 | 7/1962 | Pearson | 340—244 |
| 3,204,183 | 8/1965 | Hasenzahl. | |

NEIL C. READ, *Primary Examiner.*

D. L. TRAFTON, *Assistant Examiner.*